(12) United States Patent
Lee et al.

(10) Patent No.: US 7,266,053 B2
(45) Date of Patent: Sep. 4, 2007

(54) TRAY-OUT CONTROL METHOD FOR MOVING OUT A LOADING TRAY OF AN OPTICAL DRIVE

(75) Inventors: Yi-Chung Lee, Taipei (TW); Chen-Jung Hsu, Taipei (TW)

(73) Assignee: Lite-On It Corporation, Neihu, Taipei (TW)

( * ) Notice: Subject to any disclaimer, the term of this patent is extended or adjusted under 35 U.S.C. 154(b) by 738 days.

(21) Appl. No.: 10/707,772

(22) Filed: Jan. 11, 2004

(65) Prior Publication Data

US 2005/0018550 A1    Jan. 27, 2005

(30) Foreign Application Priority Data

Jul. 24, 2003  (TW) .............................. 92120172 A

(51) Int. Cl.
*G11B 7/085* (2006.01)

(52) U.S. Cl. ............................... 369/30.36; 369/30.92; 720/600

(58) Field of Classification Search ............. 369/30.36, 369/30.92, 53.2, 53.22, 44.28, 53.19, 44.32, 369/44.27, 30.42, 30.48, 30.49; 720/600, 720/601, 616

See application file for complete search history.

(56) References Cited

U.S. PATENT DOCUMENTS

| | | | | |
|---|---|---|---|---|
| 6,005,833 | A * | 12/1999 | Yasuma et al. | 720/602 |
| 6,968,558 | B2 * | 11/2005 | Lee et al. | 720/600 |
| 2001/0019526 | A1 * | 9/2001 | Takeda | 369/75.2 |
| 2003/0223323 | A1 * | 12/2003 | Osawa | 369/30.36 |
| 2005/0204373 | A1 * | 9/2005 | Ueno et al. | 720/616 |

* cited by examiner

*Primary Examiner*—Ali Neyzari
(74) *Attorney, Agent, or Firm*—Winston Hsu

(57) ABSTRACT

The present invention discloses a tray-out control method for moving out a loading tray of an optical drive. A first forcing function is applied to the loading tray to overcome a lesser magnetic attraction when an optical disk is placed on the loading tray. A second forcing function is applied to the loading tray to overcome a greater magnetic attraction when the optical disk is not placed on the loading tray. A maximum value of the second forcing function is larger than a maximum value of the first forcing function.

10 Claims, 6 Drawing Sheets

TRAY-OUT CONTROL METHOD FOR MOVING OUT A LOADING TRAY OF AN OPTICAL DRIVE

BACKGROUND OF INVENTION

1. Field of the Invention

The present invention relates to a tray-out control method for moving out a loading tray of an optical drive, and more particularly, to a method for controlling a tray-out force according to whether an optical disk is placed on the loading tray.

2. Description of the Prior Art

Please refer to FIG. 1, which is a schematic diagram showing a spindle motor, a loading tray, and a clamping device installed in an optical drive. The optical drive includes the spindle motor 10, the loading tray 20, and the clamping device 40. The loading tray 20 can be used to hold an optical disk 30, and the loading tray 20 further includes a plurality of tabs 25. When the optical drive is vertically arranged, the tabs 25 can be used to help keep the optical disk 30 steady, so that the optical disk 30 will not drop out from the loading tray 20.

Please refer to FIG. 2. When the optical disk 30 is placed on the loading tray 20 and the loading tray 20 is moved into the optical drive (tray-in), the spindle motor 10 will rise and support the optical disk 30. Because the spindle motor 10 is embedded with a magnetic material (not shown) and the clamping device 40 is also embedded with a permanent magnet (not shown), the permanent magnet embedded in the clamping device 40 will be attracted by the magnetic material in the spindle motor 10 after the spindle motor 10 rising to an appropriate position. Therefore, the clamping device 40 and the spindle motor 10 can fix the optical disk 30, and the spindle motor 10 will rotate the optical disk 30 to proceed with data-search or data-access operations.

Please refer to FIG. 3. Similarly, if the loading tray 20 is moved into the optical drive (tray-in) without the optical disk 30, the spindle motor 10 will still rise and attract the permanent magnet in the clamping device 40, so that the clamping device 40 and the spindle motor 10 will be in contact with each other.

Whether the optical disk 30 is placed on the loading tray 20 or not, the spindle motor 10 will rise and attract the clamping device 40 after the loading tray 20 moves into the optical drive. When the loading tray 20 moves out (tray-out), the spindle motor 10 will descend to separate the spindle motor 10 and clamping device 40 so that the loading tray 20 can move out of the optical drive. As shown in FIG. 2, when the optical disk 30 is placed on the loading tray 20, a space will exist between the clamping device 40 and the spindle motor 10. Because the optical disk 30 is placed between the clamping device 40 and the spindle motor 10, the magnetic attraction is diminished. As shown in FIG. 3, when the loading tray 20 is not placed with the optical disk 30, the clamping device 40 and the spindle motor 10 are closely in contact with each other and the magnetic attraction between the clamping device 40 and the spindle motor 10 is strengthened.

When the loading tray 20 moves out, the force applied to the loading tray 20 must overcome the strengthened magnetic attraction for separating the closely contacted spindle motor 10 and the clamping device 40. If the loading tray 20 is placed with the optical disk 30, the magnetic attraction is lower and the same face described above moves loading tray 20 will vibrate more seriously.

According to the prior art, when the optical drive is horizontally arranged and the loading tray 20 is placed with the optical disk 30, the vibration of the loading tray 20 will not lead to harmful impacts. However, when the optical drive is vertically arranged and the loading tray 20 is placed with the optical disk 30, the vibration of the loading tray will cause the tabs 25 of the loading tray 20 to be unable to hold the optical disk 30 when the loading tray 20 moves out by applying the same force. Afterwards, the optical disk 30 will drop and be damaged.

If the tray-out force applied to the loading tray 20 diminishes, the tray-out force may not overcome the magnetic attraction so that the loading tray 20 may not successfully move out.

SUMMARY OF INVENTION

It is therefore a primary objective of the claimed invention to provide a tray-out control method for moving out a loading tray of an optical drive and to solve the above-mentioned problems.

In the claimed invention, a novel tray-out control method is disclosed for stably moving the loading tray out of the optical drive (tray out) no matter if the loading tray is placed with the optical disk or not. Therefore, the optical disk will never drop out of the loading tray and the loading tray will always successfully move out.

According to the claimed invention, a tray-out control method for moving out a loading tray of an optical drive comprises detecting whether an optical disk is paced on the loading tray. A first forcing function is applied to the loading tray when the optical disk is placed on the loading tray. A second forcing function is applied to the loading tray when the optical disk is not placed on the loading tray. A maximum value of the second forcing function is larger than a maximum value of the first forcing function.

According to the claimed invention, a tray-out control method used in an optical drive for overcoming an attraction between a spindle motor and an clamping device includes applying a first forcing function to a loading tray when the spindle motor and the clamping device are not in close contact with each other and applying a second forcing function to a loading tray when the spindle motor and the clamping device are in close contact with each other. A maximum value of the second forcing function is larger than a maximum value of the first forcing function.

These and other objectives of the present invention will no doubt become obvious to those of ordinary skill in the art after reading the following detailed description of the preferred embodiment, which is illustrated in the various figures and drawings.

DETAILED DESCRIPTION

Figure 1:
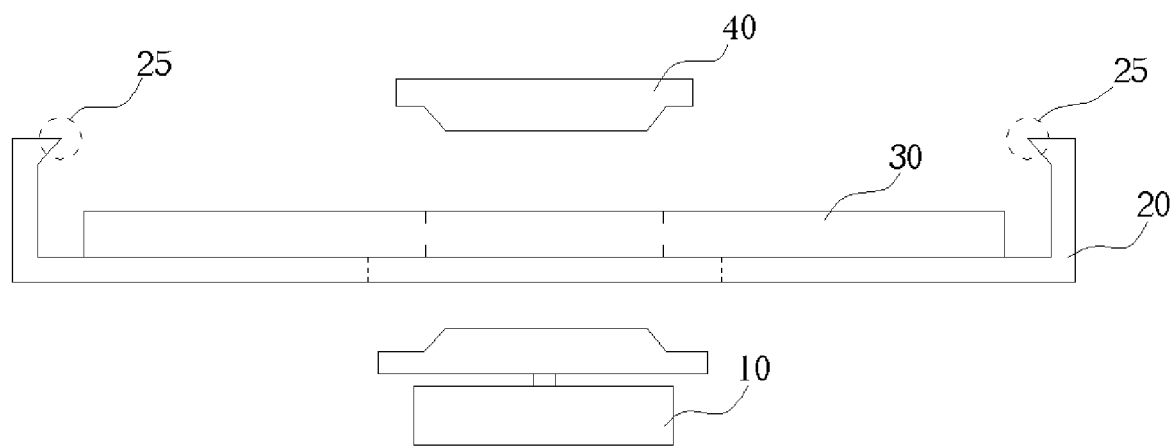
FIG. 1 is a schematic diagram showing a spindle motor, a loading tray, and a clamping device installed in an optical drive.
Figure 2:
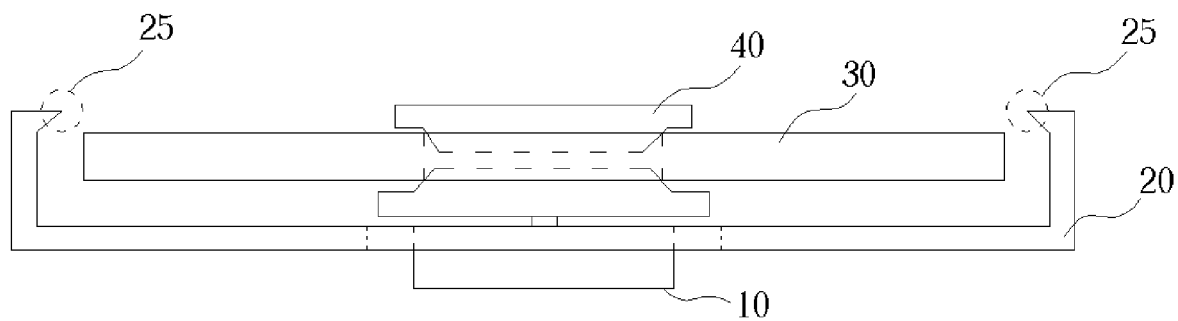
FIG. 2 is a schematic diagram showing an optical disk placed on the loading tray and the loading tray is in the optical drive (tray-in).
Figure 3:
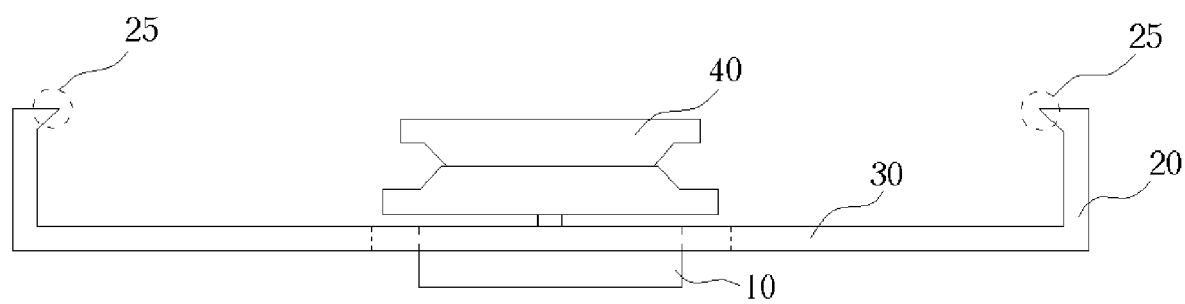
FIG. 3 is a schematic diagram showing no optical disk placed on the loading tray and the loading tray is in the optical drive (tray-in).
Figure 4:
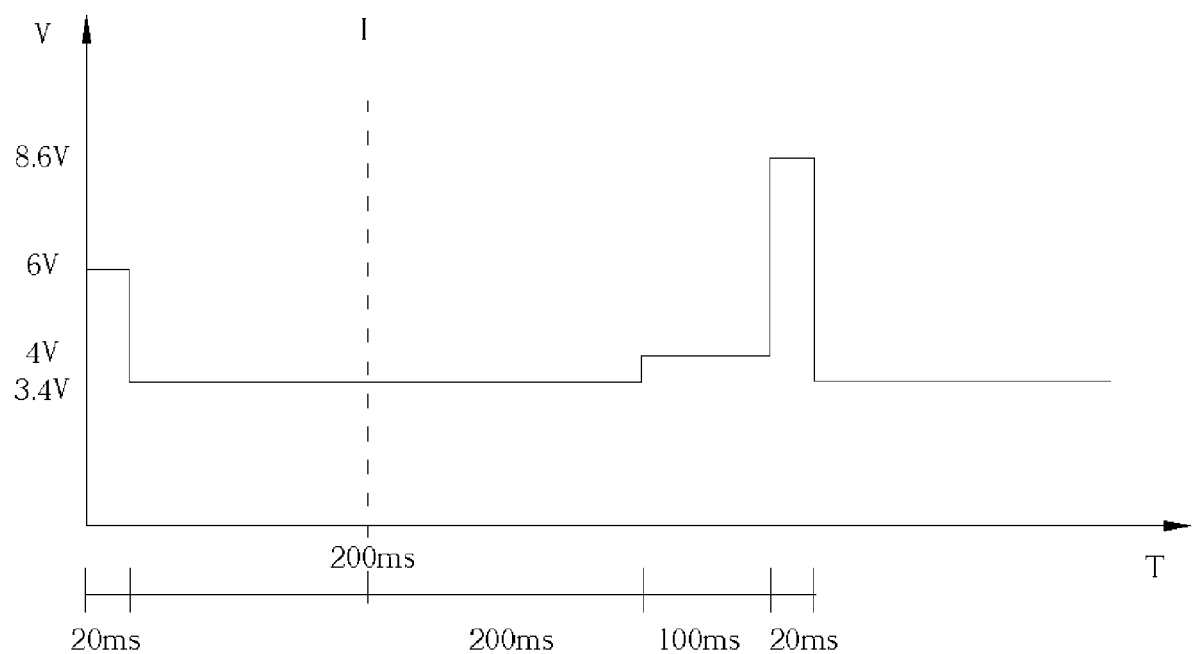
FIG. 4 is a waveform diagram of a tray-out force applied to the loading tray of the optical drive according to the present invention when an optical disk is placed on the loading tray.
Figure 5:
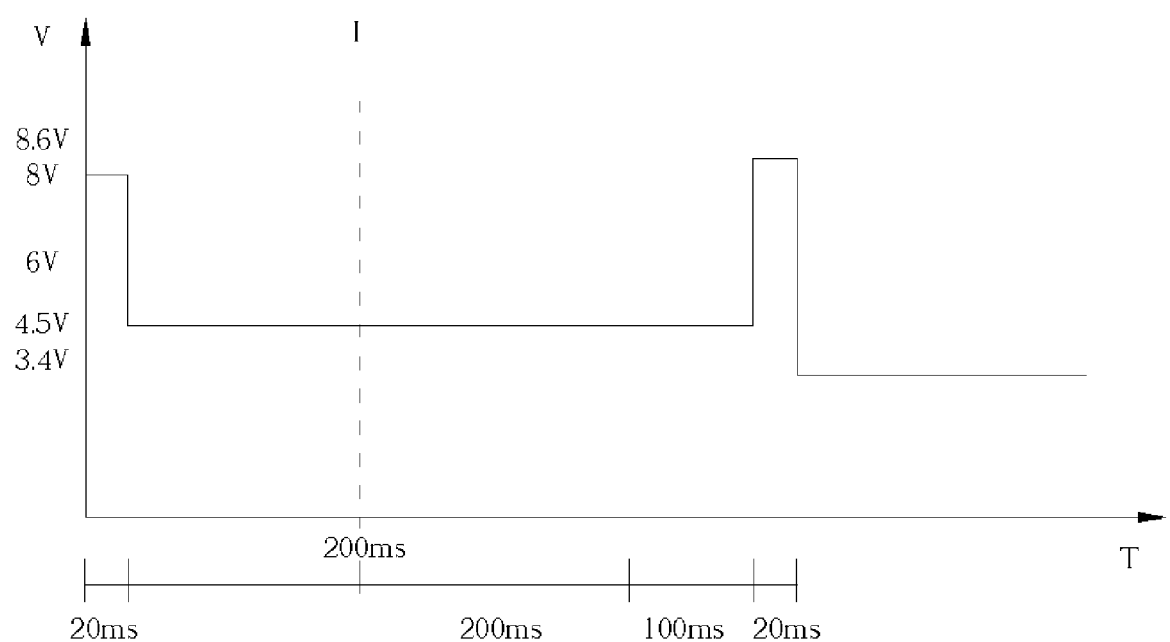
FIG. 5 is a waveform diagram of a tray-out force applied to the loading tray of the optical drive according to the present invention when an optical disk is not placed on the loading tray.

The present invention mainly and significantly improves the conditions when the optical drive is vertically arranged. Please refer to FIG. 4 and FIG. 5. FIG. 4 and FIG. 5 both show waveforms of a tray-out force applied on the loading tray of the optical drive according to the present invention. Voltage (V) represents the magnitude of the tray-out force applied on the loading tray. The higher the voltage, the more intense the magnitude of the tray-out force.

As shown in FIG. 4, which is a waveform diagram of a tray-out force applied to the loading tray of the optical drive according to the present invention when an optical disk is placed on the loading tray. When the optical disk is placed on the loading tray and the loading tray moves out, as shown in FIG. 4, a 6-V tray-out force is provided within the first 20 ms, then the voltage of the tray-out force remains at 3.4V until 200 ms. The dotted line I marked at 200 ms represents that the loading tray will be no longer affected by the magnetic attraction. A contact sensor, such as a limit switch, can be used to sense the correct timing. After 200 ms, a proper voltage can be easily provided to the tray-out force to move the loading tray placed with the optical disk.

As shown in FIG. 5, which is a waveform diagram of a tray-out strength applied to the loading tray of the optical drive according to the present invention when the optical disk is not placed on the loading tray. When the loading tray of the optical drive moves out without being placed with the optical disk, as shown in FIG. 5, an 8-V voltage (for moving out the loading tray) is provided within the first 20 ms, then the voltage remains at 4.5V till 200 ms. The dotted line I marked at 200 ms represents that the loading tray will be no longer affected by the magnetic attraction. After 200 ms, another proper voltage can be easily provided to the tray-out force to move the loading tray not placed with the optical disk.

From the above-mentioned embodiments of the present invention, when the loading tray is placed with the optical disk, a lesser tray-out force can be provided for the loading tray to overcome the attraction generated by the permanent magnet. Therefore, the lesser tray-out strength will never vibrate the loading tray seriously enough to destabilize the optical disk. When the loading tray is not placed with the optical disk, a greater tray-out force should be applied to the loading tray to overcome the attraction generated by the permanent magnet. Therefore, the greater tray-out force will never be too small to move out the loading tray. In addition, the characteristics of the present invention will significantly improve the conditions in the vertically arranged optical drive.

Figure 6:
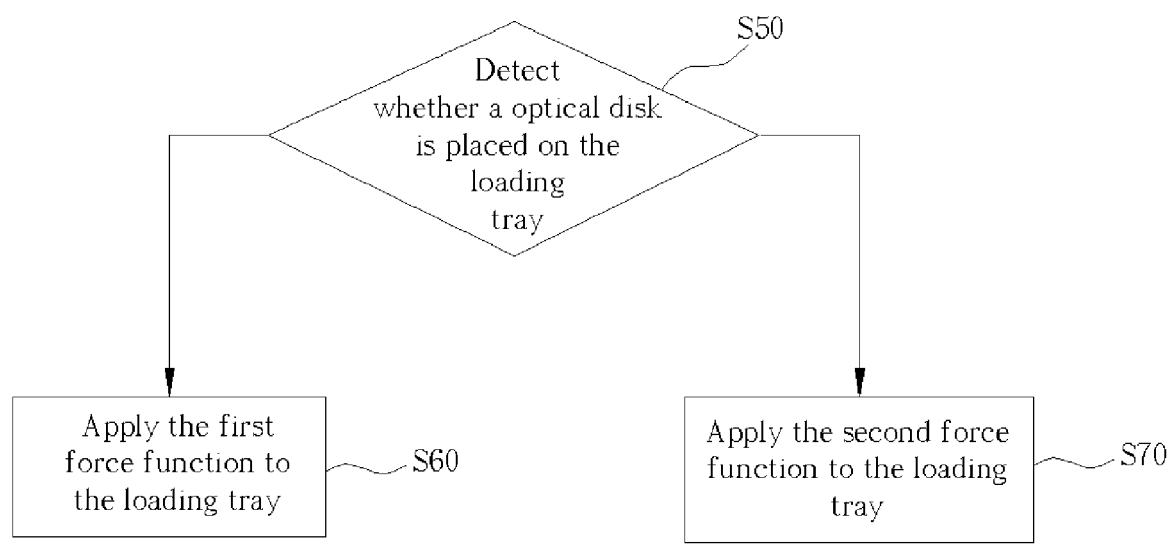
FIG. 6 is a flowchart showing a control method for moving out the loading tray of the optical drive according to the present invention.

Please refer to FIG. 6, which is a flowchart showing a control method for moving out the loading tray of the optical drive according to the present invention. When the loading tray moves out, first detect whether the optical disk is placed on the loading tray of the optical drive (S50). If the loading tray is placed with the optical disk, a first forcing function is applied to the loading tray of the optical drive (S60) to overcome a lesser magnetic attraction. If the loading tray is not placed with the optical disk, a second forcing function is applied to the loading tray of the optical drive (S70) to overcome a greater magnetic attraction. The maximum value of the second forcing function is larger than the maximum value of first forcing function.

Therefore, the advantage of the present invention is to provide a sound tray-out control method for the loading tray of the optical drive. According to the present invention, the first forcing function can be applied to the loading tray to prevent the optical disk from dropping out of the loading tray due to the serious vibration.

Another advantage of the present invention is to provide the second forcing function applied to the loading tray to prevent the loading tray without being placed with an optical disk from failing to tray out due to the attraction.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A tray-out control method for moving out a loading tray of an optical drive comprising:
   detecting whether an optical disk is paced on the loading tray;
   applying a first forcing function to the loading tray when the optical disk is placed on the loading tray; and
   applying a second forcing function to the loading tray when the optical disk is not placed on the loading tray;
   wherein an initial force of the second forcing function is larger than an initial force of the first forcing function.

2. The tray-out control method of claim 1 wherein the second forcing function is used to overcome a greater magnetic attraction.

3. The tray-out control method of claim 2 wherein the greater magnetic attraction is generated from a close contact between a spindle motor and a clamping device.

4. The tray-out control method of claim 1 wherein the first forcing function is used to overcome a lesser magnetic attraction.

5. The tray-out control method of claim 4 wherein the lesser magnetic attraction is generated from a non-close contact between a spindle motor and a clamping device.

6. The tray-out control method of claim 1 wherein the optical drive is vertically arranged.

7. A tray-out control method used in an optical drive for overcoming an attraction between a spindle motor and a clamping device comprising:
   applying a first forcing function to a loading tray when the spindle motor and the clamping device are not closely in contact with each other; and
   applying a second forcing function to a loading tray when the spindle motor and the clamping device are closely in contact with each other;
   wherein an initial force of the second forcing function is larger than an initial force of the first forcing function.

8. The tray-out control method of claim 7 wherein when the spindle motor and the clamping device are not closely in contact with each other, an optical disk is placed on the loading tray.

9. The tray-out control method of claim 7 wherein when the spindle motor and the clamping device are closely in contact with each other, an optical disk is not placed on the loading tray.

10. The tray-out control method of claim 7 wherein the optical drive is vertically arranged.

* * * * *